US012790517B2

(12) United States Patent
Cha et al.

(10) Patent No.: US 12,790,517 B2
(45) Date of Patent: Nov. 10, 2026

(54) PAINT PROTECTION FILM

(71) Applicant: SANGBO CORPORATION, Gimpo-si (KR)

(72) Inventors: Hyun Soo Cha, Gimpo-si (KR); Su Youn Bae, Gimpo-si (KR); Jin Ho Kim, Gimpo-si (KR)

(73) Assignee: Sangbo Corporation, Gyeonggi-do (KR)

( * ) Notice: Subject to any disclaimer, the term of this patent is extended or adjusted under 35 U.S.C. 154(b) by 158 days.

(21) Appl. No.: 18/879,574

(22) PCT Filed: Jun. 28, 2023

(86) PCT No.: PCT/KR2023/009065

§ 371 (c)(1),
(2) Date: Dec. 27, 2024

(87) PCT Pub. No.: WO2024/005550

PCT Pub. Date: Jan. 4, 2024

(65) Prior Publication Data

US 2025/0388781 A1 Dec. 25, 2025

(30) Foreign Application Priority Data

Jun. 30, 2022 (KR) ........................ 10-2022-0080922

(51) Int. Cl.

| | |
|---|---|
| ***C09J 7/25*** | (2018.01) |
| ***C08K 3/36*** | (2006.01) |
| ***C09D 7/40*** | (2018.01) |
| ***C09D 7/61*** | (2018.01) |
| ***C09D 7/63*** | (2018.01) |
| ***C09D 127/12*** | (2006.01) |
| ***C09D 175/04*** | (2006.01) |
| ***C09J 133/00*** | (2006.01) |

(52) U.S. Cl.

CPC .................. *C09J 7/25* (2018.01); *C08K 3/36* (2013.01); *C09D 7/61* (2018.01); *C09D 7/63* (2018.01); *C09D 7/67* (2018.01); *C09D 127/12* (2013.01); *C09D 175/04* (2013.01); *C09J 133/00* (2013.01); *C08K 2201/005* (2013.01); *C08K 2201/011* (2013.01); *C09J 2203/306* (2013.01); *C09J 2301/122* (2020.08); *C09J 2301/302* (2020.08); *C09J 2400/14* (2013.01); *C09J 2475/00* (2013.01)

(58) Field of Classification Search

None

See application file for complete search history.

(56) References Cited

U.S. PATENT DOCUMENTS

| | | | |
|---|---|---|---|
| 2010/0196704 | A1 | 8/2010 | Suzuki |
| 2018/0094164 | A1 | 4/2018 | Ito et al. |
| 2021/0114361 | A1 | 4/2021 | Ho et al. |

FOREIGN PATENT DOCUMENTS

| | | | |
|---|---|---|---|
| JP | 2013-199522 | A | 10/2013 |
| JP | 2018-053193 | A | 4/2018 |
| JP | 2018-053194 | A | 4/2018 |
| JP | 2021-534289 | A | 12/2021 |

OTHER PUBLICATIONS

International Search Report and Written Opinion dated Oct. 6, 2023, issued in PCT Application No. PCT/KR2023/009065, filed Jun. 28, 2023, partial translation.

*Primary Examiner* — Cheng Yuan Huang

(74) *Attorney, Agent, or Firm* — Workman Nydegger

(57) ABSTRACT

A paint protection film includes: a substrate layer having a thermoplastic polyurethane; a top coating layer formed on one surface of the substrate layer; an adhesive layer formed on the other surface of the substrate layer; and a nanoparticle layer between the substrate layer and the adhesive layer, and has, in the top coating layer, a fluorine compound, with a glass transition temperature of preferably 10-50° C., formed from a combination of at least one olefin including fluorine and a curing agent, wherein the olefin includes a fluoroethylene olefin and a vinyl ether olefin, and the nanoparticle layer includes preferably 0.5-2 parts by weight of nanosilica on the basis of 100 parts by weight of the nanoparticle layer. The paint protection film has excellent stain resistance, and has excellent durability such as that for elongation, such that painting curved surfaces of an automobile and the like is convenient.

7 Claims, 6 Drawing Sheets

| | Initial | Left for 30 mins | Coating Appearance | Precipitation |
|---|---|---|---|---|
| Nano silica |  |  |  | X |
| Acryl beads |  |  |  | O |

Example 1 Example 3 Example 4

| Particle Size | Microscopic Observation |
|---|---|
| Under 100nm |  |
| 1μm ~ 5μm |  |
| 5μm ~ 10μm |  |
| Over 10μm |  |

PAINT PROTECTION FILM

TECHNICAL FIELD

The present disclosure relates to a paint protection film, more specifically to a paint protection film including a substrate layer containing thermoplastic polyurethane, a top coating layer formed on one side of the substrate layer, an adhesive layer formed on other side of the substrate layer, and a nanoparticle layer between the substrate layer and adhesive layer, where a fluorine compound of top coating layer with glass transition temperature of 10° C. to 50° C. is formed from a combination of at least one olefin containing fluorine and a curing agent, the olefin includes fluoroethylene olefin and vinyl ether olefin, and the nanoparticle layer preferably includes 0.5 to 2 parts by weight of nanosilica per 100 parts by weight of nanoparticle layer, resulting in excellent anti-fouling properties and durability such as elongation, making it easy to apply to curved surfaces with paint, such as automobiles.

BACKGROUND ART

On the surfaces of transportation means such as ships and automobiles, paint formed by mixing pigments and solvents is applied to protect the surface. When paint is damaged and peeled off, paint's adhesion and moisture resistance functions are weakened. Conventional paint protection films have primarily been developed to protect surfaces of ships, aircraft, helicopters, etc., from sand or flying debris, with main purpose of preventing paint from peeled off surfaces of transportations.

While these films protect paint, they fall short of providing same effect as paint itself, and applying self-healing paint protection film to curved surfaces is not popularly used because it is quite challenging, requiring skilled professionals to handle task, and having burden of cost.

Conventional paint protection films using thermoplastic polyurethane (TPU) have excellent flexibility, making them easy to attach to curved surfaces, but have the disadvantage of easily contaminated film surfaces. Therefore, the present disclosure aims to provide a paint protection film with excellent anti-fouling properties that is easy to apply along with painting.

DISCLOSURE

Technical Problem

Accordingly, the present disclosure has been made keeping in mind the above problems occurring in the related art.

An objective of the present disclosure is to provide a paint protection film with improved anti-fouling properties comprising a substrate layer including thermoplastic polyurethane, a top coating layer formed on one side of the substrate layer, and an adhesive layer formed on other side of the substrate layer, wherein the top coating layer includes a fluorine compound.

Another objective of the present disclosure is to provide a paint protection film with superior anti-fouling and self-healing properties compared to conventional films using polyurethane as top coating, wherein the fluorine compound is formed from a combination of at least one olefin including fluorine and a curing agent, and the olefin includes fluoroethylene olefin and vinyl ether olefin.

Yet another objective of the present disclosure is to provide improved durability including a paint protection film with elongation, by further comprising a nanoparticle layer formed between the substrate layer and adhesive layer, wherein the nanoparticle layer includes 0.5 to 6 parts by weight of nanosilica per 100 weight parts of nanoparticle layer.

Yet another objective of the present disclosure is to provide a paint protection film that prevents haze phenomenon by ensuring that the nanoparticle layer includes preferably 0.5 to 2 parts by weight of nanosilica per 100 parts by weight of nanoparticle layer.

Yet another objective of the present disclosure is to provide a paint protection film that prevents agglomeration and precipitation of nanosilica within nanoparticle layer by ensuring that nanosilica included in the nanoparticle layer has an average particle diameter of less than 100 nm.

Technical Solution

The present disclosure may be implemented by one or more embodiments having some or all of the following configurations.

According to an embodiment of the present disclosure, the paint protection film according to the present disclosure comprises a substrate layer containing thermoplastic polyurethane, a top coating layer formed on one side of the substrate layer, an adhesive layer formed on other side of the substrate layer, wherein the top coating layer includes a fluorine compound.

According to an embodiment of the present disclosure, the fluorine compound is formed from a combination of at least one olefin containing fluorine and a curing agent, wherein the olefin includes fluoroethylene olefin and vinyl ether olefin.

According to an embodiment of the present disclosure, glass transition temperature of the fluorine compound is preferably 10° C. to 50° C., wherein number average molecular weight is 10000 to 15000 and a weight average molecular weight is 40000 to 45000.

According to an embodiment of the present disclosure, the curing agent comprises an isocyanate-based curing agent or an adduct-based curing agent, wherein the top coating layer includes 15 to 25 parts by weight of the curing agent.

According to an embodiment of the present disclosure, it further comprises a nanoparticle layer formed between the substrate layer and the adhesive layer, wherein the nanoparticle layer includes 0.5 to 6 parts by weight of nanosilica per 100 parts by weight of nanoparticle layer.

According to an embodiment of the present disclosure, the nanoparticle layer preferably comprises 0.5 to 2 parts by weight of nanosilica per 100 parts by weight of nanoparticle layer.

According to an embodiment of the present disclosure, the nanosilica included in the nanoparticle layer has an average particle diameter of less than 100 nm.

Advantageous Effects

The present disclosure may achieve the follow effects from the embodiment and configurations described below, as well as combinations and relationships of use thereof.

According to the present disclosure, the present disclosure comprises a substrate layer containing thermoplastic polyurethane, a top coating layer formed on one side of the substrate layer, an adhesive layer formed on other side of the substrate layer, and the top coating layer includes a fluorine compound, thereby improving anti-fouling properties.

Additionally, according to the present disclosure, the present disclosure provides superior anti-fouling and self-healing effects compared to conventional films using polyurethane as top coating, as the fluorine compound is formed from a combination of at least one olefin containing fluorine and a curing agent, and the olefin includes fluoroethylene olefin and vinyl ether olefin.

Furthermore, according to the present disclosure, the present disclosure provides an effect of offering a paint protection film with improved durability, including elongation, by further comprising a nanoparticle layer formed between the substrate layer and the adhesive layer, wherein the nanoparticle layer includes 0.5 to 6 parts by weight of nanosilica per 100 parts by weight of nanoparticle layer.

Moreover, according to the present disclosure, the present disclosure prevents haze phenomenon by ensuring that the nanoparticle layer preferably comprises 0.5 to 2 parts by weight of nanosilica per 100 parts by weight of the nanoparticle layer.

Furthermore, according to the present disclosure, the present disclosure has an effect of preventing agglomeration and precipitation of nanosilica within nanoparticle layer by ensuring that nanosilica included in the nanoparticle layer has an average particle diameter of less than 100 nm.

MODE FOR INVENTION

Hereinafter, the self-healing paint protection film according to the present disclosure will be described in detail with reference to the accompanying drawings. Also, detailed descriptions of known functions and configurations that may unnecessarily obscure the gist of the present disclosure are omitted. Unless defined otherwise, all terms used herein have same meaning as understood by those skilled in the art to which the present disclosure belongs, and in case of conflict with the meaning of a term used herein, the definition used herein shall apply.

Figure 1:
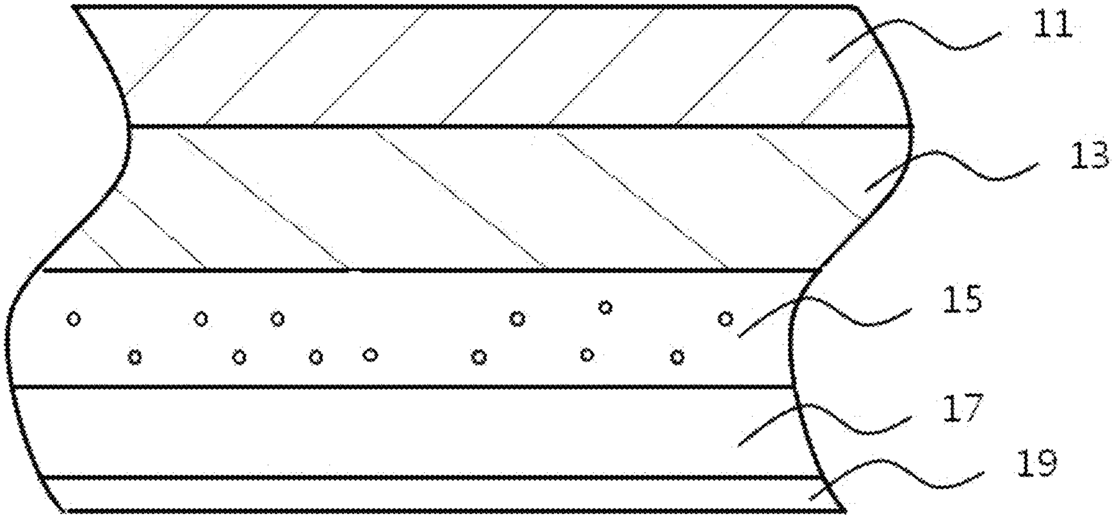
FIG. 1 is a cross-sectional view showing a paint protection film according to Example 1 of the present disclosure.

FIG. 1 is a cross-sectional view showing paint protection film 1 according to an embodiment of the present disclosure. The paint protection film 1 has a multi-layer structure and includes top coating layer 11 as a first layer, thermoplastic polyurethane layer (TPU) 13 as a second layer, and nanoparticle layer 15 as a third layer. Additionally, the paint protection film 1 may preferably include adhesive layer 17 formed of a pressure-sensitive adhesive, and release liner 19 releasably bonded to adhesive layer 17 to protect the adhesive layer 17.

The top coating layer 11 includes fluorine compound to ensure anti-fouling properties and durability, resulting in excellent self-healing. While conventional top coating layers may use coatings including polyurethane, polyester, (meth) acrylic, PVDF resin, or combinations thereof, a preferred embodiment of the present disclosure may use fluorine compound. Fluorine compound refers to a compound containing fluorine atoms in its molecular structure, preferably a general term for synthetic polymers, which shows weather resistance, heat resistance, and anti-fouling properties due to high durability against heat, light, and contaminants based on large bond energy between carbon atoms and fluorine atoms. Additionally, compared to polymer compounds such as polyurethane used in conventional top coatings, it exhibits low abrasion and high water repellency due to shorter interatomic distances. Fluorine compound according to the present disclosure is formed from a combination of at least one olefin containing fluorine and a curing agent, and is preferably fluoroethylene vinyl ether (FEVE). Mixture of FEVE (fluoroethylene vinyl ether) with MEK or toluene is a copolymer with repeating units of fluoroethylene and substituted vinyl ether, and FEVE-based top coating layer according to the present disclosure can exhibit both characteristics of hydrocarbon and fluoropolymer. The FEVE resin is an amorphous A-B type copolymer with repeating units of fluoroethylene and substituted vinyl ether, and unlike pure fluoropolymers, FEVE resin is soluble in solvents due to vinyl ether.

Figure 2:
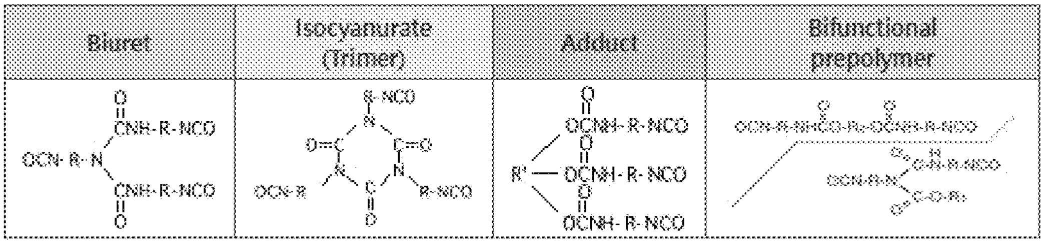
FIG. 2 is a diagram showing chemical formulas of isocyanate-based curing agents.
Figure 3:
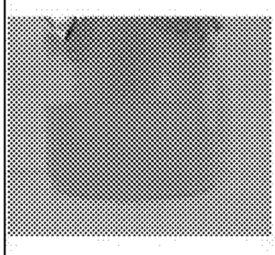
FIG. 3 is a diagram showing precipitation status when using nanosilica and acrylic beads in nanoparticle layer of the present disclosure.
Figure 3:
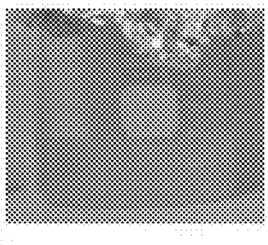
Figure 3:
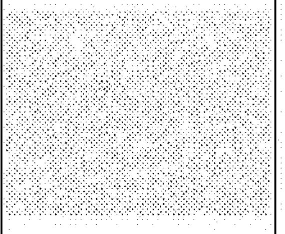
Figure 3:
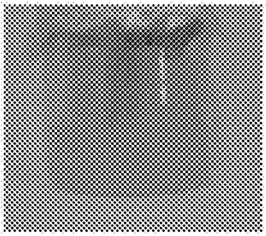
Figure 3:
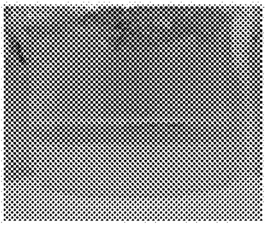
Figure 3:
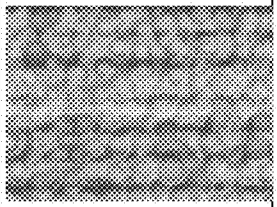

Isocyanate-based curing agent can be used as curing agent for the top coating layer 11. Isocyanate-based curing agents form cross-links by reacting with active hydrogen. Toluene diisocyanate (TDI) and methylene diphenyl diisocyanate (MDI) can be used as isocyanate-based curing agents. As shown in FIG. 2, isocyanate-based curing agents can be classified as biuret, isocyanurate, bifunctional prepolymer, adduct, etc., and isocyanurate or isocyanate-based adduct can preferably be used as curing agent. The isocyanurate is produced by heating aliphatic and aromatic isocyanates, and the reaction is accelerated by an alkaline catalyst. The adduct is an additive product of curing agent and may have at least one isocyanate group. When using isocyanurate and adduct among isocyanate-based curing agents, color change rate of top coating layer against contamination is low, making them suitable for use. Top coating layer 11 of the present disclosure can improve anti-fouling properties of coating layer by adjusting content of curing agent along with FEVE, and accordingly, coating layer with improved anti-fouling properties and durability can be obtained by mixing isocyanurate among isocyanate-based curing agents in a specific weight % range. Isocyanurate as the curing agent is preferably included in 15 to 25 parts by weight based on weight of the top coating layer.

For substrate layer 13, thermoplastic polyurethane can be used, which is mixture of known polyols such as polycarbonate-based or polyester-based polyols and curing agents such as isocyanate. Using conventional methods, for example, polyurethane layer is formed by casting or otherwise coating an aqueous dispersion or solvent solution mixture on releasable carrier web or liner.

The nanoparticle layer 15 can be provided between thermoplastic polyurethane layer (TPU) 13 as second layer and adhesive layer 17 to secure durability by increasing elongation of the film. Nanoparticle layer 15 includes nanoparticles at a certain weight % within a layer mixed with resins formed of polyamic acid, polyimide, polyester, polyurethane or combinations thereof, and resins composed of acrylic, modified acrylic or combinations thereof, and the nanoparticles can use particles such as CNT, silica, acrylic beads, etc. Acrylic resin is not particularly limited in type if it is used for conventional paints. Specifically, polymerized acrylic monomers such as methyl acrylate, ethyl acrylate, propyl acrylate, butyl acrylate, methyl methacrylate, ethyl methacrylate, propyl methacrylate, butyl methacrylate, etc. can be used. At this time, content can be adjusted so that dispersion of particles in dispersant and coating of resin are smooth. In the present disclosure, when incorporating nanosilica, it resulted in excellent dispersion and improved durability including elongation, and as described later, preferably, when 0.5 to 2 parts by weight of nanosilica is included per 100 parts by weight of nanoparticle layer 15, result of minimizing haze of the film was obtained. In particular, it is preferable to use silica as nanoparticles in terms of precipitation and coatability.

Figure 4:
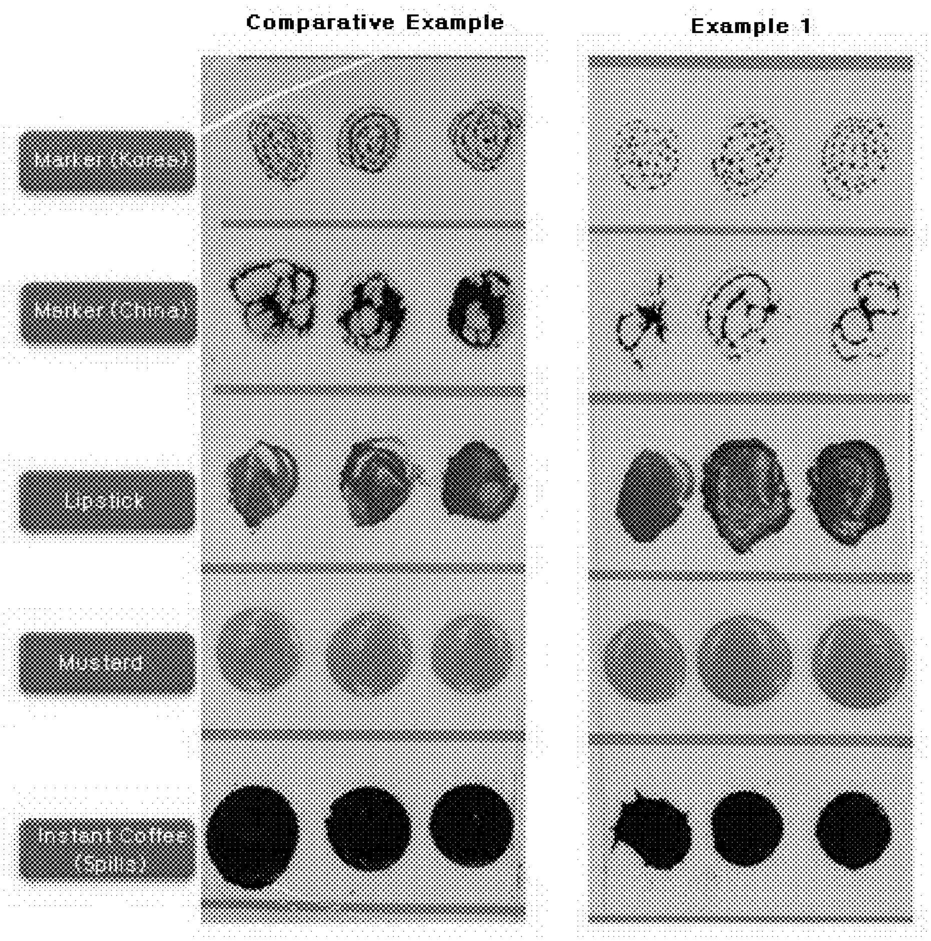
FIG. 4 is a photograph immediately after spraying contaminants on Comparative Example and Example 1 of the present disclosure.

As shown in FIG. 4, nanosilica and acrylic beads were dispersed in a dispersant and evaluated for precipitation and coatability after 30 minutes, and when using nanosilica, no precipitation of silica particles occurred, and coating of dispersion showed a uniform dispersion of particles. However, when acrylic beads were used as nanoparticles, precipitation occurred, and coating of dispersion showed an appearance of agglomerated particles. In one embodiment of the present disclosure, the nanoparticle layer 15 can improve durability of film by increasing elongation of film. Particularly, as the top coating layer 11 includes fluoroethylene vinyl ether (FEVE) instead of polyurethane, top coating layer may be more rigid. Nanoparticles such as nanosilica incorporated in nanoparticle layer 15 of the present disclosure can mediate elongation between molecules and/or particles, thereby increasing elongation of film.

Adhesive layer 17 was formed by laminating acrylic pressure-sensitive adhesive on release liner through heat, and release liner 19 can use known compositions such as release paper.

Example 1

75 wt % of mixture of fluoroethylene vinyl ether (FEVE, FEVE resin from AGC Chemicals) with glass transition temperature (Tg) of 10 to 50° C., number average molecular weight of 10,000 to 15,000, and weight average molecular weight of 40,000 to 45,000, and MEK (methyl ethyl ketone, Samchun Chemical Co., Ltd., Korea) (preferably 30 wt % FEVE and 45 wt % MEK), and 25 wt % of isocyanurate (Tosoh Corporation, Japan) as an isocyanate-based curing agent were mixed to form a solution of top coating layer 11.

For substrate layer 13, a thermoplastic polyurethane (TPU, SWM 49510-60DV, USA) solution, mixture of polycarbonate-based and polyester-based polyols and isocyanate-based curing agent was used, and for adhesive layer 17, acrylic pressure-sensitive adhesive (AICA op-3510-2, Japan) on release liner was used.

For nanoparticle layer 15 between substrate layer 13 and adhesive layer 17, a nanoparticle layer solution was formed by mixing 1 wt % of nanosilica with average particle diameter of 50 nm (Nissan Chemical, Japan), 20 wt % of polyurethane resin (Toyo Ink Co., Ltd., urethane resin, Japan), 15 wt % of modified acrylic resin (Toshiba, Japan), and 64 wt % of MEK solvent (Samchun Chemical Co., Ltd., Korea).

These solutions were layered in membrane form to create paint protection film. Thermoplastic polyurethane (TPU) solution for the substrate layer 13 was formed by casting or coating on a releasable carrier web or liner. Top coating layer 11 and nanoparticle layer 15 were formed by casting or coating on a releasable carrier web or liner, or by casting on one side of substrate layer 13. Adhesive layer 17 was formed by laminating pressure-sensitive adhesive through heat.

Example 2

For paint protection film of Example 1, a paint protection film with a top coating layer was formed by replacing half the weight (preferably 15 wt %) of fluoroethylene vinyl ether (FEVE) with glass transition temperature (Tg) 10~50° C., number average molecular weight 10,000~15,000, weight average molecular weight 40,000~45,000 constituting top coating layer 11 with polycarbonate-based and polyester-based polyols (SWM, USA).

Example 3

A paint protection film was formed by replacing fluorine compound constituting top coating layer 11 of Example 1 with a fluorine compound having a glass transition temperature of 60~80° C. (AGC Chemicals).

Example 4

A paint protection film was formed by replacing fluorine compound constituting top coating layer 11 of Example 1 with fluorine compound formed through modified silicon fluorine (Shin-Etsu Chemical Co., Ltd.) with a glass transition temperature of 50~80° C.

Example 5

A paint protective film with content of 15 wt % of isocyanurate, a curing agent comprising top coating layer 11 of Example 1, was formed.

Example 6

A paint protective film with content of 20 wt % of isocyanurate, a curing agent comprising top coating layer 11 of Example 1, was formed.

Example 7

A paint protective film with content of 30 wt % of isocyanurate, a curing agent comprising top coating layer 11 of Example 1, was formed.

Example 8

A paint protective film with content of 20 wt % of biuret (Tosoh Corporation, Japan), a curing agent comprising top coating layer 11 of Example 1, was formed.

Example 9

A paint protective film with content of 25 wt % of biuret, a curing agent comprising top coating layer 11 of Example 1, was formed.

Example 10

A paint protective film with content of 15 wt % of isocyanate-based adduct (Tosoh Corporation, Japan), a curing agent comprising top coating layer 11 of Example 1, was formed.

Example 11

A paint protective film with content of 20 wt % of isocyanate-based adduct, a curing agent comprising top coating layer 11 of Example 1, was formed.

Example 12

A paint protective film with content of 25 wt % of isocyanate-based adduct, a curing agent comprising top coating layer 11 of Example 1, was formed.

Example 13

A paint protective film with content of 30 wt % of isocyanate-based adduct, a curing agent comprising top coating layer 11 of Example 1, was formed.

Example 14

A paint protection film was formed without nanosilica incorporated in nanoparticle layer 15 of Example 1.

Example 15

A paint protection film was formed with 0.2 wt % of nanosilica incorporated in nanoparticle layer 15 of Example 1.

Example 16

A paint protection film was formed with 0.5 wt % of nanosilica incorporated in nanoparticle layer 15 of Example 1.

Example 17

A paint protection film was formed with 2 wt % of nanosilica incorporated in nanoparticle layer 15 of Example 1.

Example 18

A paint protection film was formed with 3 wt % of nanosilica incorporated in nanoparticle layer 15 of Example 1.

Example 19

A paint protection film was formed with 4 wt % of nanosilica incorporated in nanoparticle layer 15 of Example 1.

Example 20

A paint protection film was formed with 5 wt % of nanosilica incorporated in nanoparticle layer 15 of Example 1.

Example 21

A paint protection film was formed with 6 wt % of nanosilica incorporated in nanoparticle layer 15 of Example 1.

Example 22

A paint protection film was formed with 7 wt % of nanosilica incorporated in nanoparticle layer 15 of Example 1.

Example 23

A paint protection film was formed with 8 wt % of nanosilica incorporated in nanoparticle layer 15 of Example 1.

Example 24

A paint protection film was formed with 1 wt % of nanosilica with an average particle diameter of 100 nm incorporated in nanoparticle layer 15 of Example 1.

Example 25

A paint protection film was formed with 1 wt % of nanosilica with an average particle diameter of 300 nm incorporated in nanoparticle layer 15 of Example 1.

Example 26

A paint protection film was formed with 1 wt % of nanosilica with an average particle diameter of 1 μm incorporated in nanoparticle layer 15 of Example 1.

Example 27

A paint protection film was formed with 1 wt % of nanosilica with an average particle diameter of 3 μm incorporated in nanoparticle layer 15 of Example 1.

Example 28

A paint protection film was formed with 1 wt % of nanosilica with an average particle diameter of 5 μm incorporated in nanoparticle layer 15 of Example 1.

Example 29

A paint protection film was formed with 1 wt % of nanosilica with an average particle diameter of 7 μm incorporated in nanoparticle layer 15 of Example 1.

Comparative Example 1

A paint protection film was formed by mixing 75 wt % of polycarbonate-based and polyester-based polyols (SWM 49510-60DV, USA) and 25 wt % of isocyanate-based curing agent (Tosoh Corporation, Japan) for top coating layer 11 of paint protection film in Example 1.

Staining and Discoloration Test

Contaminants were sprayed on top coating layer of films formed by Examples 1 and 2, and Comparative Example 1 as shown in FIG. 4 and Table 1 below. After a specified time, surface was wiped with isopropyl alcohol (IPA), and degree of staining and discoloration on surface was evaluated.

Figure 5:
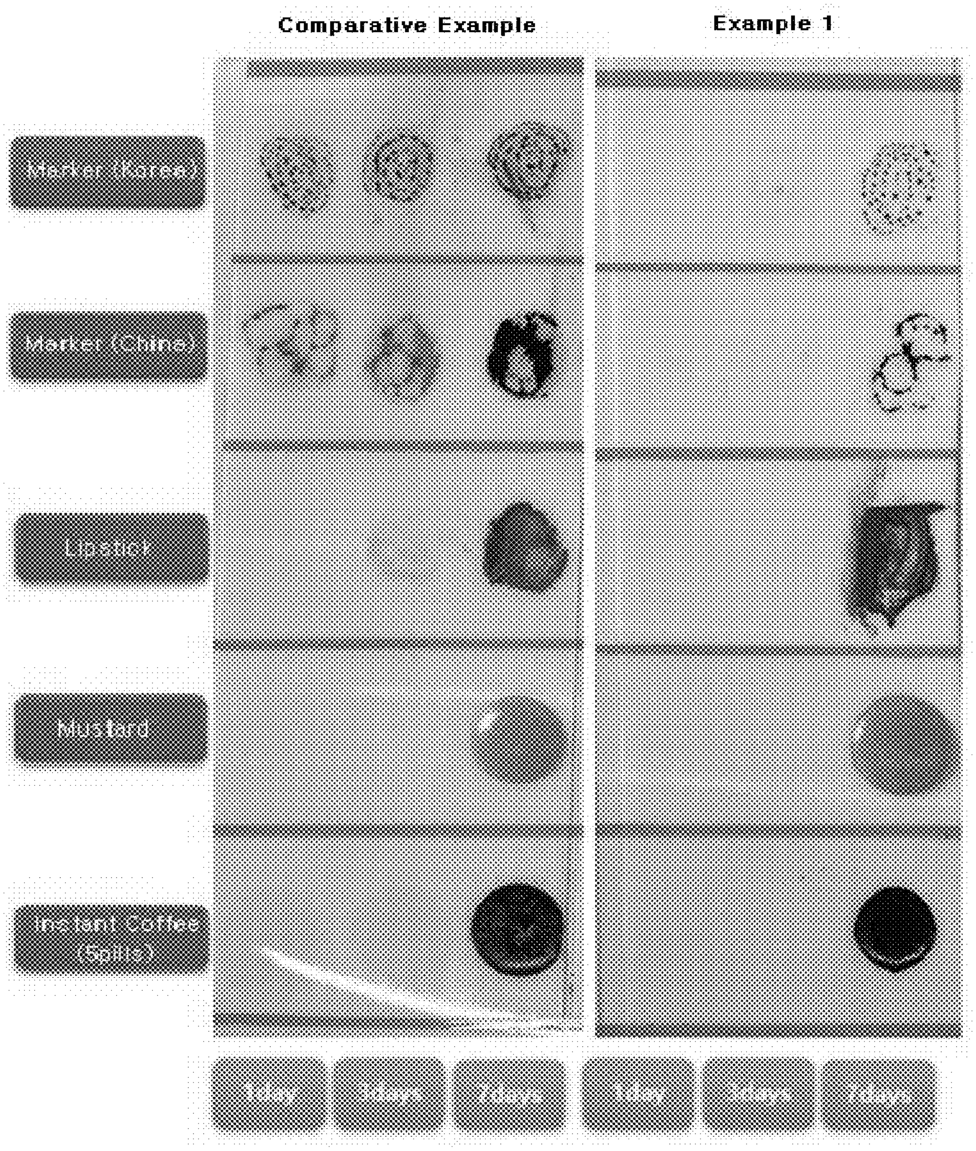
FIG. 5 is a photograph after removing contaminants using isopropyl alcohol after spraying contaminants and letting time pass on the Comparative Example and Example 1 of the present disclosure.

Visual assessment showed that surface of film formed by Example 1 had less staining from contaminants compared to film formed from Comparative Example. As shown in FIG. 5, when contaminants were sprayed on film surface and removed with IPA after 1 day and 3 days, film surface according to Example 1 showed almost no staining, while film surface according to Comparative Example showed staining and discoloration. Additionally, when contaminants were sprayed on film surface and removed with IPA after 7 days, it was observed that less contaminant remained on film surface according to Example 1.

To quantify rate of color change due to contaminants, color difference of film surface was measured before spraying contaminants and after removing them with IPA 24 hours after spraying, and measurement was conducted using a Konica Minolta cm-5 spectrophotometer in visible light range of 380 nm~780 nm wavelength according to ASTM E-313. Rates of color change for Examples 1 and 2 and Comparative Example are shown in Table 1 below.

TABLE 1

| | Contaminant | dE*ab(Color Difference) | dYI(D1925) |
|---|---|---|---|
| Example 1 | Marker | 0.04 | −0.06 |
| | Dye | 0.06 | 0.09 |
| | Coffee | 0.03 | 0.04 |
| Example 2 | Marker | 1.56 | 2.50 |
| | Dye | 0.83 | 1.54 |
| | Coffee | 0.08 | 0.12 |
| Comparative Example | Marker | 2.32 | 3.20 |
| | Dye | 1.80 | 2.60 |
| | Coffee | 0.12 | 0.18 |

In Table 1, dE*ab is color difference calculated according to formula ΔE*ab=[ΔL*)2+(Δa*)2+(Δb*)2]1/2, and dYI represents color change in yellowness index calculated according to ASTM D1925. Therefore, it can be seen that film including top coating layer 11 according to Example 1 has a color change rate of less than 0.1%, while in case of Example 2 and Comparative Example, a significant color change in top coating layer was observed.

Durability Evaluation Based on Glass Transition Temperature of Fluorine Compounds To evaluate anti-fouling properties and durability of top coating according to glass transition temperature of fluorine compound constituting top coating layer 11, film of Example 3 used a fluorine compound with a glass transition temperature of 60~80° C. compared to film of Example 1, while film of Example 4 used a modified silicon fluorine with a glass transition temperature of 50~80° C.

Self-healing, solvent resistance, and anti-fouling properties against marker were evaluated for film of Example 1 and films with top coating layers of Examples 3 and 4. Self-healing evaluation was conducted by visually assessing recovery after scratching coating layer surfaces of Examples 1, 3, and 4 with a copper brush. Solvent resistance was evaluated by observing coating layer damage from a carb&choke Cleaner solvent formed by mixing 43 wt % MeOH, 15 wt % MC (methylene chloride), and 42 wt % Tol. For anti-fouling evaluation, coating layer surfaces were marked with a marker, then marker was removed using IPA to determine if stains remained.

Figure 6:
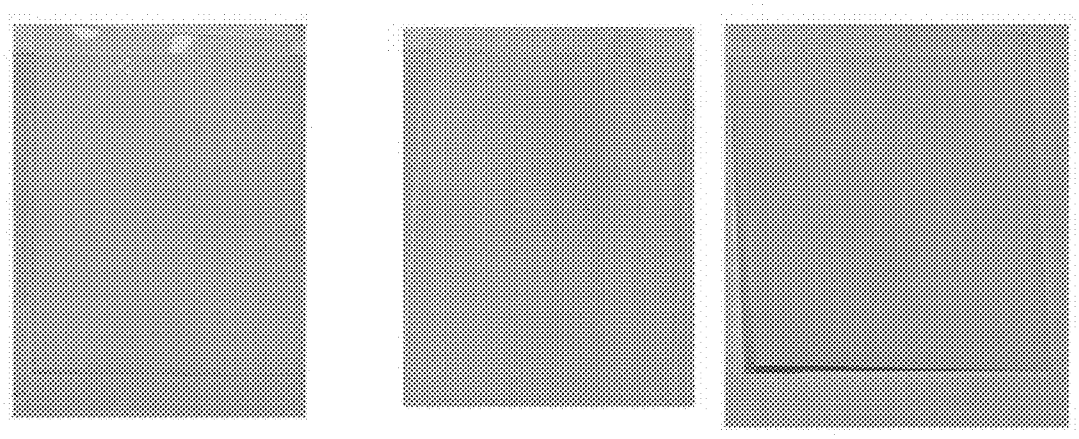
FIG. 6 is a photograph after marking with a marker on film surface of Example 1 and top coating layer surface of Example 3 and 4, and then removing the marker using IPA.

As shown in Table 2 and FIG. 6 below, for top coating layers with same film thickness of 10 μm, coating surfaces of Examples 3 and 4 have lower elongation compared to film of Example 1, and have the problem of requiring hot water for scratch recovery. Additionally, weak stains from contaminants can be observed remaining on coating surfaces of Examples 3 and 4.

TABLE 2

| | Example 1 | Example 3 | Example 4 |
|---|---|---|---|
| Film thickness (μm) | 10 | 10 | 10 |
| Elongation rate (%) | 200 | 175 | 190 |
| Solvent resistnace | Good | Good | Good |
| Self-healing | Self-healed within 5 mins | Some scratches remain on hot water contact | Restore with hot water contact |
| Visual assessment of pollution level of marker | Good | Weak stain remains | Weak stain remains |

Evaluation of Anti-Fouling Properties According to Curing Agent Type and Content To evaluate anti-fouling properties of top coating layer according to type and content of curing agent constituting top coating layer 11, anti-fouling properties were evaluated by varying content of isocyanurate and biuret as curing agents for top coating layer of film according to Example 1. Anti-fouling properties were assessed by spraying contaminants on coating layer surface, removing them with IPA after a specified time, and then measuring color difference (dYI) of film surface using a Konica Minolta cm-5 spectrophotometer in visible light range of 380 nm to 780 nm wavelength according to ASTM E-313. As a result, as shown in Tables 3 and 4 below, examples using isocyanurate as a curing agent showed smaller dYI values compared to examples using biuret, indicating less color change and excellent anti-fouling properties. Preferably, when isocyanurate was included as a curing agent at 20 to 25 wt %, it was confirmed that color difference (dYI) was small and anti-fouling properties were excellent.

TABLE 3

| | Example 1 | Example 5 | Example 6 | Example 7 | Example 8 | Example 9 |
|---|---|---|---|---|---|---|
| Curing Agent/ Content (wt %) | Isocyanurate/25 | Isocyanurate/15 | Isocyanurate/20 | Isocyanurate/30 | Biuret/20 | Biuret/25 |
| Marker (0 hr) | 0.31 | 0.77 | 0.21 | 0.71 | 1.31 | 2.21 |
| Marker (3 hr) | 0.35 | 0.81 | 0.51 | 1.15 | 1.38 | 2.25 |
| Marker (6 hr) | 0.38 | 0.84 | 0.75 | 1.25 | 1.41 | 2.45 |
| Marker (24 hr) | 0.41 | 0.91 | 0.94 | 1.41 | 1.48 | 2.78 |

TABLE 4

| | Example 10 | Example 11 | Example 12 | Example 13 |
|---|---|---|---|---|
| Curing Agent/Content (wt %) | Isocyanate-based adduct/15 | Isocyanate-based adduct/20 | Isocyanate-based adduct/25 | Isocyanate-based adduct/30 |
| Marker (0 hr) | 0.75 | 0.38 | 0.41 | 0.52 |
| Marker (3 hr) | 0.80 | 0.59 | 0.62 | 0.81 |
| Marker (6 hr) | 0.91 | 0.80 | 0.88 | 1.10 |
| Marker (24 hr) | 1.03 | 1.01 | 1.05 | 1.58 |

Elongation Evaluation According to Nanosilica Content in Nanoparticle Layer

To evaluate film elongation according to content of nanoparticles, preferably nanosilica, in nanoparticle layer 15, elongation evaluation was conducted by varying nanosilica content for nanoparticle layer of film according to Example 1. Films of examples were elongated in uniaxial direction using a film stretcher, then compared with length of film before elongation. As shown in Table 5 below, differences in elongation rate according to additive content can be confirmed, and elongation rate significantly increases within nanosilica content of 0.5~6%. However, when excessive nanosilica is added, preferably when more than 4 wt % is added, haze of about 2% occurs, which is an obstacle to use as a transparent film. Therefore, when using this invention as a transparent film, it is preferable to incorporate 0.5~4 weight % of nanosilica, and considering durability effect versus usage amount, it is more preferable to incorporate 0.5~2 weight % of nanosilica.

TABLE 5

| | Example | | | | | | | | | | |
|---|---|---|---|---|---|---|---|---|---|---|---|
| | 1 | 14 | 15 | 16 | 17 | 18 | 19 | 20 | 21 | 22 | 23 |
| Content (wt %) | 1 | 0 | 0.2 | 0.5 | 2 | 3 | 4 | 5 | 6 | 7 | 8 |
| Elongation Rate (%) | 133.5 | 120 | 122 | 130 | 133.7 | 133.4 | 132.7 | 132.6 | 132.6 | 125 | 120 |

Figure 7:
FIG. 7 is a microscope photograph of nanoparticle layer to evaluate dispersibility of nanoparticles according to average particle diameter of nanosilica in nanoparticle layer 15.
Figure 7:
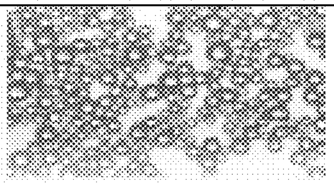
Figure 7:
Figure 7:
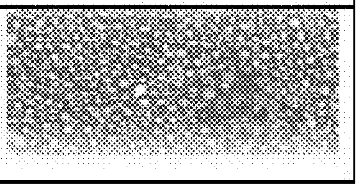

Agglomeration Experiment According to Nanosilica Particle Diameter in Nanoparticle Layer To evaluate dispersion of nanoparticles, preferably nanosilica, according to average particle diameter in nanoparticle layer 15, nanoparticle layer of film according to Example 1 was diluted in solvent with varying average diameters of nanosilica, left for over an hour, and then evaluated for precipitation and agglomeration through microscope. As seen in Table 6 and FIG. 7 below, Examples 1, 24, and 25 showed no precipitation or agglomeration, but as particle diameter increased, particles were observed to clump together. Diameter of particles dispersed in nanoparticle layer 15 is preferably less than 300 nm, but more preferably less than 100 nm. When average particle diameter is 1 μm or larger, precipitation and agglomeration occur due to swelling, causing problems with reduced coating performance.

TABLE 6

| | Example | | | | | | |
|---|---|---|---|---|---|---|---|
| | 1 | 24 | 25 | 26 | 27 | 28 | 29 |
| Average Diameter | 50 nm | 100 nm | 300 nm | 1 μm | 3 μm | 5 μm | 7 μm |
| Precipitation | No Occurence | No Occurence | No Occurence | No Occurence | No Occurence | Occurence | Occurence |
| Cohesion | No Occurence | No Occurence | No Occurence | Occurence | Occurence | Occurence | Occurence |

Therefore, disclosed paint protection film has excellent self-healing and anti-fouling properties, and superior durability including elongation, making it suitable for use as a film to protect painted surfaces with curves, such as automobiles.

The description provides an exemplary embodiment of the present disclosure, and the present disclosure may be used in other various combination, changes, and environments. That is, the present disclosure may be changed or modified within the scope of the present disclosure described herein, a range equivalent to the description, and/or within the knowledge or technology in the related art. The embodiments show an optimum state for achieving the spirit of the present disclosure, and various modifications required for specific applications and uses of the present disclosure are also possible. Therefore, the detailed description of the present disclosure is not intended to limit the present disclosure in the embodiment. In addition, the claims should be construed as including other embodiments.

The invention claimed is:

1. A paint protection film comprising;

a substrate layer including thermoplastic polyurethane;

a top coating layer formed on one side of the substrate layer;

an adhesive layer formed on other side of the substrate layer; and a nanoparticle layer formed between the substrate layer and the adhesive layer; wherein the nanoparticle layer includes 0.5 to 6 parts by weight of nanosilica per 100 parts by weight of nanoparticle layer, and wherein the top coating layer includes a fluorine compound so as to improve stain resistance.

2. The paint protection film according to claim 1, wherein the fluorine compound is formed from a combination of at least one olefin containing fluorine and a curing agent, and the olefin includes fluoroethylene olefin and vinyl ether olefin.

3. The paint protection film according to claim 2, wherein glass transition temperature of the fluorine compound is preferably 10° C. to 50° C., number average molecular weight is 10,000 to 15,000, and weight average molecular weight is 40,000 to 45,000.

4. The paint protection film according to claim 3, wherein the top coating layer includes an isocyanate-based curing agent in an amount of 15 to 25 parts by weight based on weight of top coating layer.

5. The paint protection film according to claim 4, wherein the curing agent is an isocyanurate or an isocyanate-based adduct.

6. The paint protection film according to claim 1, wherein the nanoparticle layer preferably includes 0.5 to 2 parts by weight of nanosilica per 100 parts by weight of the nanoparticle layer.

7. The paint protection film according to claim 1, wherein nanosilica included in the nanoparticle layer has an average particle diameter of less than 100 nm.

* * * * *